(12) United States Patent
Seo

(10) Patent No.: US 9,232,467 B2
(45) Date of Patent: Jan. 5, 2016

(54) METHOD FOR CONTROLLING POWER IN A WIRELESS COMMUNICATION SYSTEM ADOPTING A CARRIER AGGREGATION TECHNIQUE, AND APPARATUS FOR SAME

(75) Inventor: Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 61 days.

(21) Appl. No.: 14/003,591

(22) PCT Filed: Apr. 12, 2012

(86) PCT No.: PCT/KR2012/002747
§ 371 (c)(1),
(2), (4) Date: Sep. 6, 2013

(87) PCT Pub. No.: WO2012/144763
PCT Pub. Date: Oct. 26, 2012

(65) Prior Publication Data
US 2014/0064170 A1    Mar. 6, 2014

Related U.S. Application Data

(60) Provisional application No. 61/476,743, filed on Apr. 18, 2011.

(51) Int. Cl.
*H04L 5/00* (2006.01)
*H04W 52/02* (2009.01)

(52) U.S. Cl.
CPC ........... *H04W 52/0206* (2013.01); *H04L 5/001* (2013.01); *H04L 5/0098* (2013.01); *H04W 52/0216* (2013.01); *H04W 52/0229* (2013.01); *H04W 52/0235* (2013.01); *H04L 5/0016* (2013.01); *H04L 5/0053* (2013.01)

(58) Field of Classification Search
None
See application file for complete search history.

(56) References Cited

U.S. PATENT DOCUMENTS

| | | |
|---|---|---|
| 2005/0063331 A1 | 3/2005 | Kim et al. |
| 2010/0284332 A1 | 11/2010 | Kim et al. |
| 2011/0002281 A1* | 1/2011 | Terry et al. .................... 370/329 |
| 2012/0314635 A1 | 12/2012 | Lee et al. |
| 2013/0336156 A1* | 12/2013 | Wei et al. ...................... 370/252 |

FOREIGN PATENT DOCUMENTS

| | | |
|---|---|---|
| JP | 2004-320153 A | 11/2004 |
| KR | 10-2005-0029254 A | 3/2005 |
| KR | 10-2010-0118535 A | 11/2010 |
| KR | 10-2011-0036518 A | 4/2011 |
| WO | WO 2010/078365 A1 | 7/2010 |
| WO | WO 2010/078962 A1 | 7/2010 |

* cited by examiner

*Primary Examiner* — Diane Lo
(74) *Attorney, Agent, or Firm* — Birch, Stewart, Kolasch & Birch, LLP

(57) ABSTRACT

The present application discloses a method in which a terminal transceives a signal to/from a base station in a wireless communication system adopting a carrier aggregation technique. More particularly, the method comprises: a step of receiving a wake-up message for a sub-component carrier which is in an idle state from said base station via a main component carrier; a step of starting to monitor said sub-component carrier after receiving said wake-up message; and a step of receiving a downlink signal from said base station or transmitting an uplink signal to said base station via said sub-component carrier.

6 Claims, 13 Drawing Sheets

(a) Control-plane protocol stack (b) User-plane protocol stack

METHOD FOR CONTROLLING POWER IN A WIRELESS COMMUNICATION SYSTEM ADOPTING A CARRIER AGGREGATION TECHNIQUE, AND APPARATUS FOR SAME

CROSS-REFERENCE TO RELATED APPLICATIONS

This application is the National Phase of PCT/2012/002747 filed on Apr. 12, 2012, which claims priority under 35 U.S.C. 119(e) to U.S. Provisional Application No. 61/476,743 filed on Apr. 18, 2011, all of which are hereby expressly incorporated by reference into the present application.

TECHNICAL FIELD

The present invention relates to a wireless communication system, and more particularly, to a method of controlling a power in a carrier aggregation applied wireless communication system and apparatus therefor.

BACKGROUND ART

3GPP LTE ($3^{rd}$ generation partnership projecting long term evolution) communication system is schematically described for one example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '$3^{rd}$ Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

DISCLOSURE OF THE INVENTION

Technical Problem

Based on the above-mentioned discussion, a method of controlling a power in a carrier aggregation applied wireless communication system and apparatus therefor shall be proposed in the following description.

Technical Solution

To achieve these and other advantages and in accordance with the purpose of the present invention, as embodied and broadly described, a method of transceiving a signal, which is transceived with a base station by a user equipment in a carrier aggregation applied wireless communication system, according to one embodiment of the present invention includes the steps of receiving a wakeup message for a secondary component carrier in a sleep state from the base station through a primary component carrier, initiating a monitoring of the secondary component carrier after receiving the wakeup message, and receiving a downlink signal from the base station trough the secondary component carrier or transmitting an uplink signal to the base station through the secondary component carrier.

Preferably, the method may further include the step of receiving a scheduling message from the base station through the primary component carrier after receiving the wakeup message.

Preferably, the wakeup message is received on a physical control channel of the primary component carrier and the physical control channel includes an indicator indicating the secondary component carrier.

To further achieve these and other advantages and in accordance with the purpose of the present invention, as embodied and broadly described, a method of transceiving a signal, which is transceived with a base station by a user equipment in a carrier aggregation applied wireless communication system, according to another embodiment of the present invention includes the steps of receiving a scheduling message for a secondary component carrier in a sleep state from the base station through a primary component carrier, initiating a monitoring of the secondary component carrier after receiving the scheduling message, receiving an activation message for the secondary component carrier from the base station, and in a subframe starting with a subframe of receiving the activation message, receiving a downlink signal from the base station trough the secondary component carrier or transmitting an uplink signal to the base station through the secondary component carrier.

Preferably, the activation message includes information on a time of receiving the scheduling message. And, the activation message is received from the base station through either the primary component carrier or the secondary component carrier.

To further achieve these and other advantages and in accordance with the purpose of the present invention, as embodied and broadly described, a method of transceiving a signal, which is transceived with a base station by a user equipment in a carrier aggregation applied wireless communication system, according to a further embodiment of the present invention includes the steps of receiving a scheduling message for a secondary component carrier in a sleep state from the base station through a primary component carrier, initiating a monitoring of the secondary component carrier by starting with an activation subframe indicated by the scheduling message, and in a subframe starting with the activation subframe or a subframe next to the activation subframe, receiving a downlink signal from the base station trough the secondary component carrier or transmitting an uplink signal to the base station through the secondary component carrier.

Preferably, the step of initiating the monitoring of the secondary component carrier includes the steps of performing a carrier sensing for a specific component carrier and if the specific component carrier is in an idle state, setting the specific component carrier to the secondary component carrier.

In the above-described embodiments of the present invention, the method may further include the step of if a downlink signal reception from the base station is completed or an uplink transmission to the base station is completed, enabling the secondary component carrier to enter the sleep state.

Advantageous Effects

According to an embodiment of the present invention, a power consumption of a user equipment in a carrier aggregation applied wireless communication system can be efficiently reduced.

Effects obtainable from the present invention are non-limited by the above mentioned effect. And, other unmentioned effects can be clearly understood from the following description by those having ordinary skill in the technical field to which the present invention pertains.

BEST MODE FOR INVENTION

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD (frequency division duplex) scheme in the present specification, the embodiment of the present invention is easily modifiable and applicable to H-FDD or TDD (time division duplex) scheme.

Figure 1:
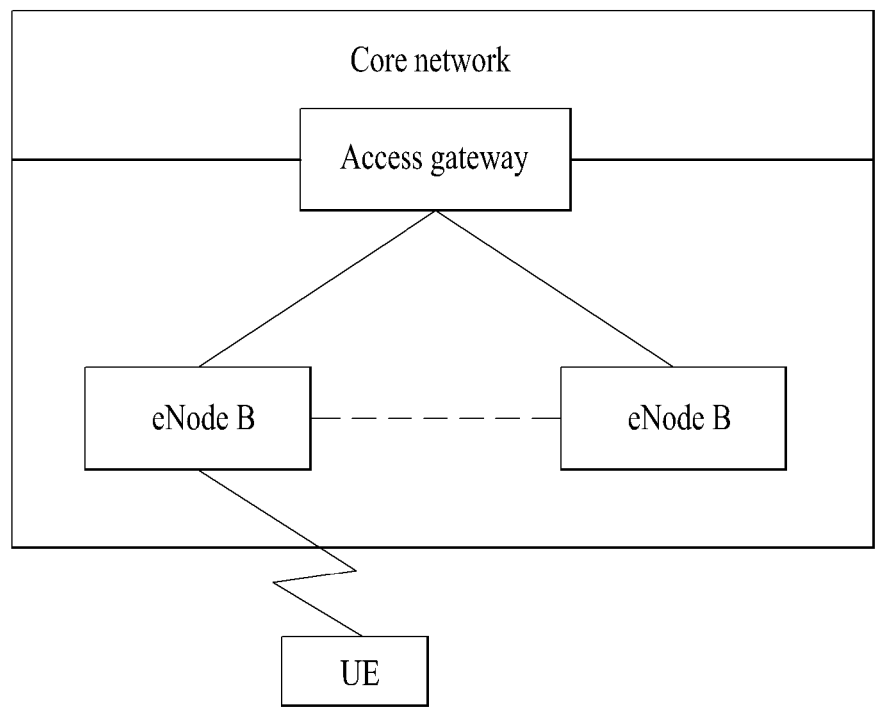
FIG. 1 is a schematic diagram of E-UMTS network structure as an example of a mobile communication system.
Figure 2:
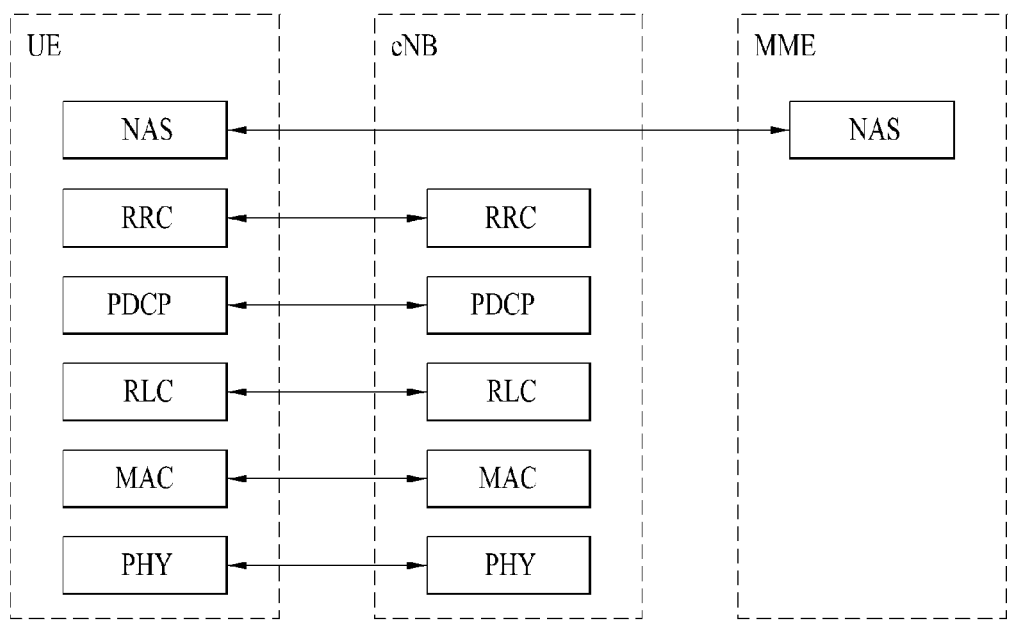
FIG. 2 is a diagram of structures of control and user planes of a radio interface protocol between a user equipment and E-UTRAN based on 3GPP radio access network specification.
Figure 2:
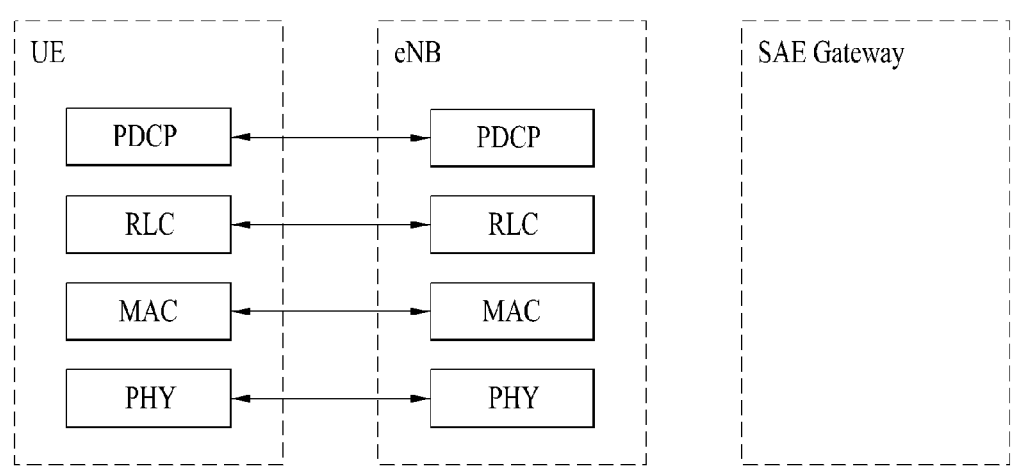

FIG. 2 is a diagram of structures of control and user planes of a radio interface protocol between a user equipment and E-UTRAN based on 3GPP radio access network specification. First of all, a control plane means a passage for transmitting control messages used by a user equipment and a network to manage a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer of the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network. In case that an RRC connection is established between an RRC layer of a user equipment and an RRC layer of a network, the user equipment is in a connected mode. Otherwise, the user equipment is in an idle mode. NAS (non-access stratum) layer above an RRC layer performs a function of session management, a function of mobility management and the like.

One cell, which constructs a base station (eNB), is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH). Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 3:
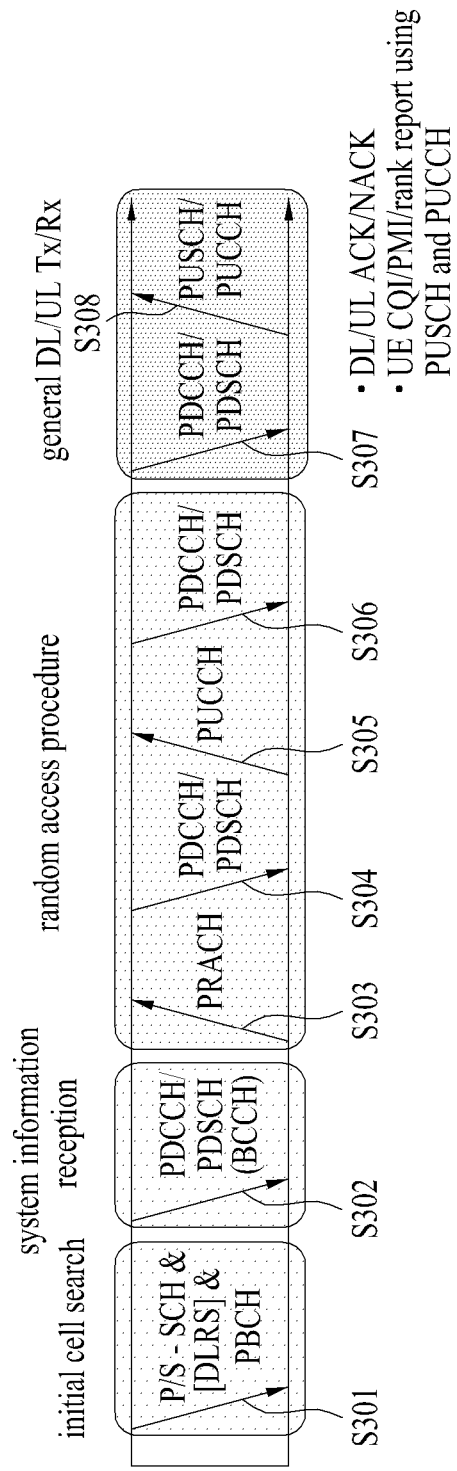
FIG. 3 is a diagram for explaining physical channels used for 3GPP system and a general method of transmitting a signal using the same.

FIG. 3 is a diagram for explaining physical channels used by 3GPP system and a general signal transmitting method using the same.

If a power of a user equipment is turned on or the user equipment enters a new cell, the user equipment performs an initial cell search for matching synchronization with a base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S302].

Meanwhile, if the user equipment initially accesses the base station or fails to have a radio resource for signal transmission, the user equipment is able to perform a random access procedure (RACH) on the base station [S303 to S306]. For this, the user equipment transmits a specific sequence as a preamble via a physical random access channel (PRACH) [S303, S305] and is then able to receive a response message via PDCCH and a corresponding PDSCH in response to the preamble [S304, S306]. In case of contention based RACH, it is able to perform a contention resolution procedure in addition.

Having performed the above mentioned procedures, the user equipment is able to perform PDCCH/PDSCH reception [S307] and PUSCH/PUCCH (physical uplink shared channel/physical uplink control channel) transmission [S308] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 4:
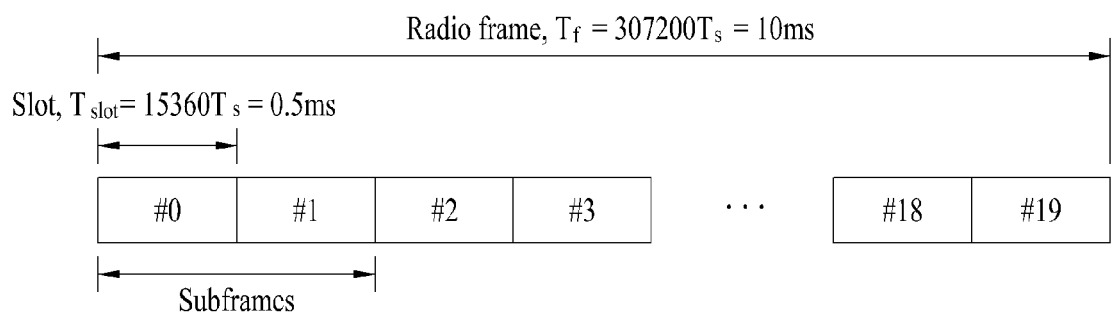
FIG. 4 is a diagram for an example of a structure of a radio frame used for LTE system.

FIG. 4 is a diagram for an example of a structure of a radio frame used by LTE system.

Referring to FIG. 4, a radio frame has a length of 10 ms ($327200 \times T_s$) and is constructed with 10 subframes in equal size. Each of the subframes has a length of 1 ms and is constructed with two slots. Each of the slots has a length of 0.5 ms ($15360 \times T_s$). In this case, $T_s$ indicates a sampling time and is expressed as $T_s=1/(15 \text{ kHz} \times 2048)=3.2552 \times 10^{-8}$ (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot can be modified in various ways.

Figure 5:
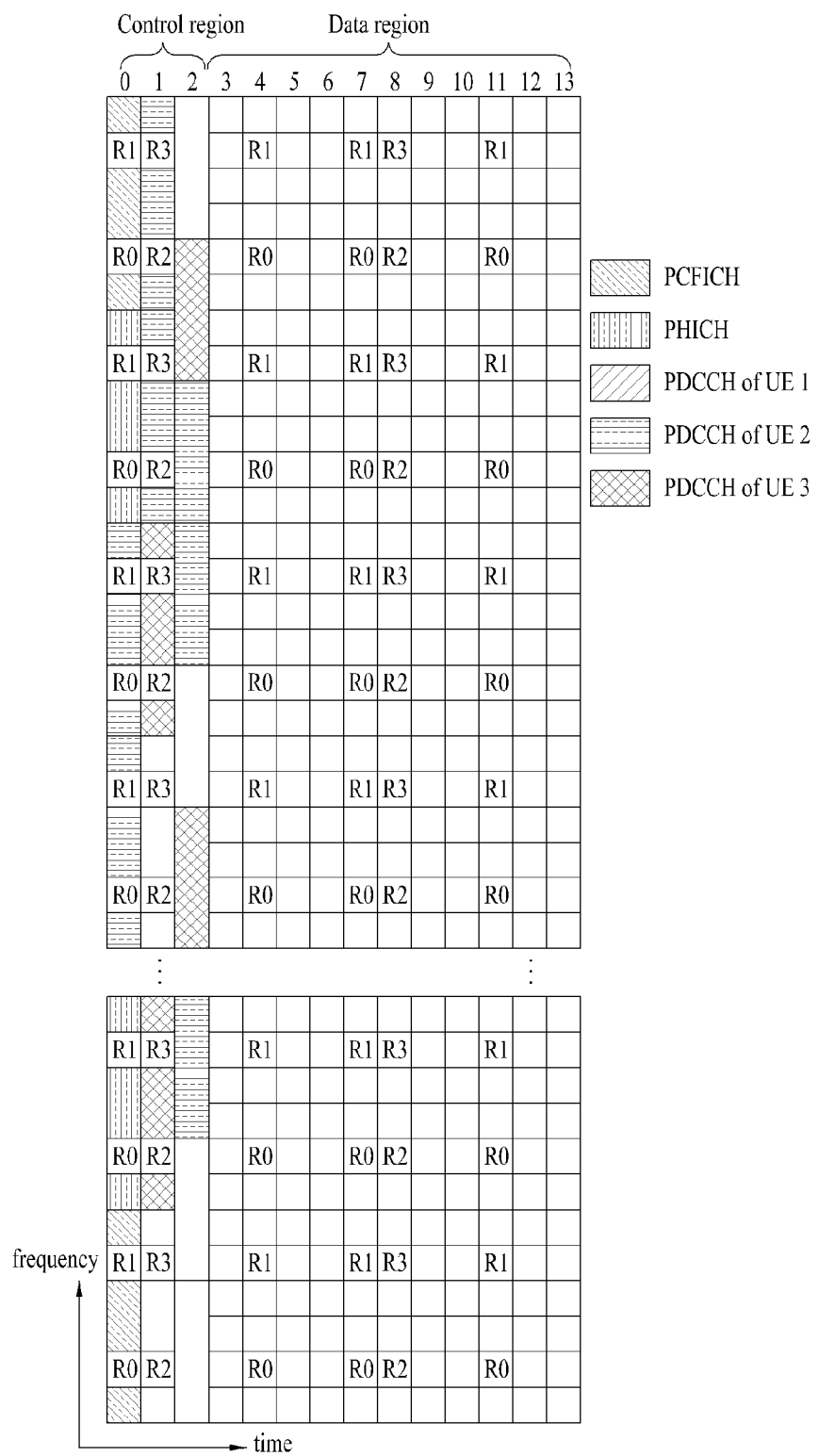
FIG. 5 is a diagram for one example of a structure of a downlink (DL) subframe used by LTE system.

FIG. 5 is a diagram for one example of a structure of a downlink (DL) subframe used by LTE system.

Referring to FIG. 5, a subframe may include 14 OFDM symbols. First 1 to 3 OFDM symbols may be used as a control region and the rest of 13 to 11 OFDM symbols may be used as a data region, in accordance with subframe configurations. In the drawing, R1 to R4 indicate reference signals (RS) for antennas 0 to 3, respectively. The RS may be fixed to a predetermined pattern in a subframe irrespective of the control region or the data region. The control region may be assigned to a resource, to which the RS is not assigned, in the control region. And, a traffic channel may be assigned to a resource, to which the RS is not assigned, in the data region. Control channels assigned to the control region may include PCFICH (Physical Control Format Indicator CHannel), PHICH (Physical Hybrid-ARQ Indicator CHannel), PDCCH (Physical Downlink Control CHannel) and the like.

The PCFICH is a physical control format indicator channel and informs a user equipment of the number of OFDM symbols used for PDCCH in each subframe. The PCFICH is situated at a first OFDM symbol and is set prior to the PHICH and the PDCCH. The PCFICH is constructed with four resource element groups (REGs). Each of the REGs is distributed within the control region based on a cell ID. One REG is constructed with four REs. In this case, the RE indicates a minimum physical resource defined as '1 subcarrier×1

OFDM symbol'. A value of the PCFICH indicates a value of '1~3' or '2~4' and is modulated by QPSK (quadrature phase shift keying).

The PHICH is a physical HARQ (hybrid-automatic repeat and request) indicator channel and is used in carrying HARQ ACK/NACK for uplink transmission. In particular, the PHICH indicates a channel for carrying DL ACK/NACK information for UL HARQ. The PHICH is constructed with 1 REG and is cell-specifically scrambled. The ACK/NACK is indicated by 1 bit and then modulated by BPSK (binary phase shift keying). The modulated ACK/NACK is spread by 'SF (spreading factor)=2 or 4'. A plurality of PHICHs mapped to the same resource configure a PHICH group. The number of the PHICHs multiplexed into the PHICH group is determined depending on the number of spreading codes. And, the PHICH (group) is repeated three times to obtain a diversity gain in frequency domain and/or time domain.

The PDCCH is a physical downlink control channel and is assigned to first n OFDM symbols of a subframe. In this case, 'n' is an integer equal to or greater than 1 and is indicated by the PCFICH. The PDCCH informs each user equipment or UE group of resource allocation information on transport channels PCH (paging channel) and DL-SCH (downlink-shared channel), uplink scheduling grant, HARQ information and the like. The PCH (paging channel) and the DL-SCH (downlink-shared channel) are carried on the PDSCH. Therefore, a base station or a user equipment normally transmits or receives data via the PDSCH except specific control information or specific service data.

Information indicating that data of the PDSCH is transmitted to a prescribed user equipment (or a plurality of user equipments), information indicating how the user equipments receive and decode PDSCH data, and the like are transmitted by being included in the PDCCH. For instance, assume that a specific PDCCH is CRC masked with RNTI (radio network temporary identity) 'A' and that information on data transmitted using a radio resource 'B' (e.g., frequency position) and transmission format information 'C' (e.g., transport block size, modulation scheme, coding information, etc.) is transmitted via a specific subframe. If so, at least one user equipment located in a corresponding cell monitors PDCCH using RNTI information of its own. If there is at least one user equipment having the RNTI 'A', the user equipments receive the PDCCH and then receive PDSCH indicated by 'B' and 'C' through the information of the received PDCCH.

Figure 6:
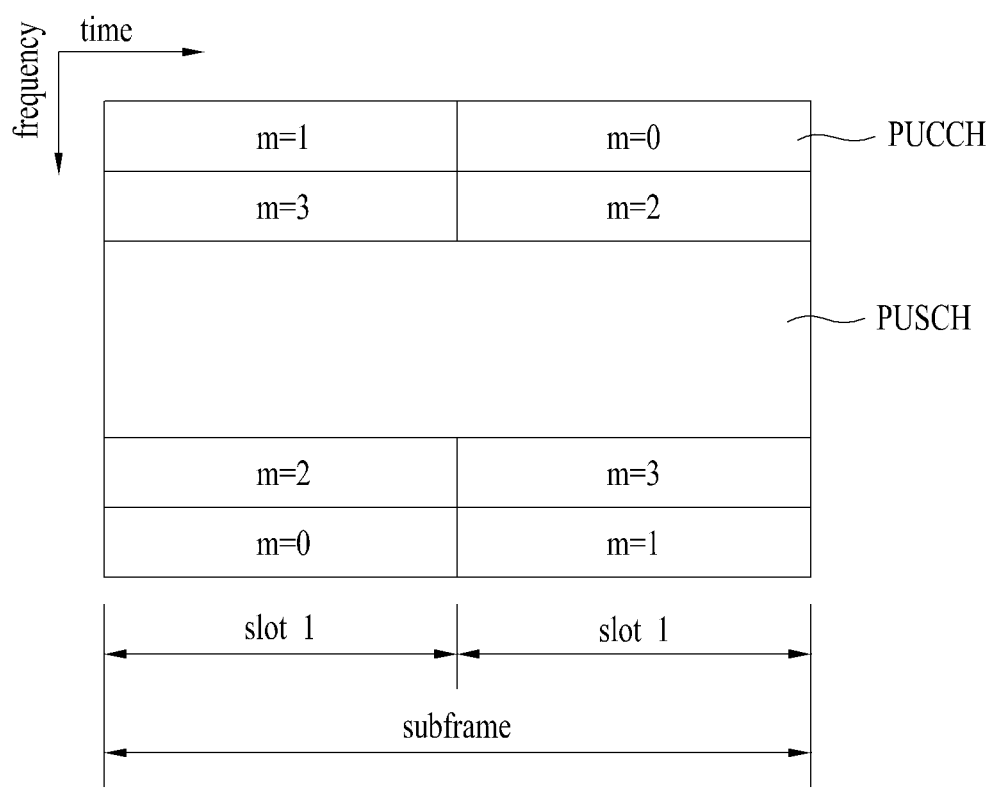
FIG. 6 is a diagram for one example of a structure of an uplink (UL) subframe used by LTE system.

FIG. 6 is a diagram for one example of a structure of an uplink (UL) subframe used by LTE system.

Referring to FIG. 6, a UL subframe may be divided into a region for assigning PUCCH (physical uplink control channel) configured to carry control information and a region for assigning PUSCH (physical uplink shared channel) configured to carry user data. A middle part of a subframe is assigned to the PUSCH and both side parts of a data region in frequency domain are assigned to the PUSCH. The control information carried on the PUCCH may include ACK/NACK used for HARQ, CQI (channel quality indicator) indicating a DL Channel state, an RI (rank indicator) for MIMO, an SR (scheduling request) that is a UL resource allocation request, and the like. The PUCCH for a single user equipment uses a single resource block occupying a different frequency in each slow within a subframe. In particular, a pair of resource blocks assigned to the PUCCH experience frequency hopping on a slot boundary. Specifically, FIG. 6 shows one example that PUCCH (m=0), PUCCH (m=1), PUCCH (m=2), and PUCCH (m=3) are assigned to the subframe.

Figure 7:
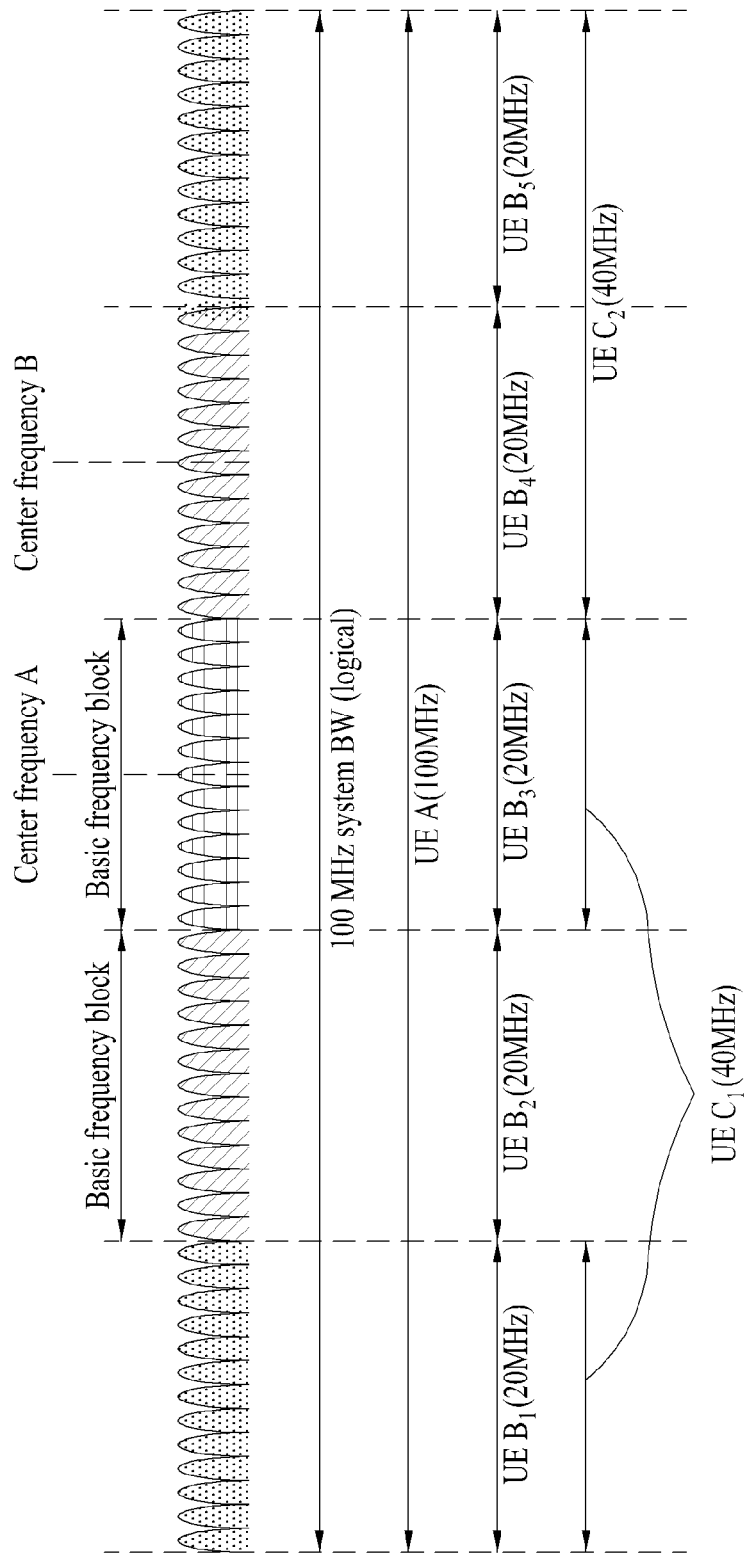
FIG. 7 is a diagram for a concept to describe a carrier aggregation (CA) scheme.

FIG. 7 is a diagram for a concept to describe a carrier aggregation scheme. Carrier aggregation means a method for a user equipment to use one wide logical frequency band using a plurality of frequency blocks or cells (in the logical meaning) configured with uplink resources (or component carriers) and/or downlink resources (or component carriers) in order for a wireless communication system to use a wider frequency band. For clarity of the following description, such a terminology as a component carrier shall be uniformly used.

Referring to FIG. 7, a full system bandwidth (BW) is a logical band and has maximum 100 MHz of bandwidth. The full system bandwidth includes 5 component carriers. And, each of the component carriers has maximum 20 MHz of bandwidth. The component carrier includes at least one contiguous subcarrier that is physically contiguous. Although FIG. 7 shows that each of the component carriers has the same bandwidth for example, each of the component carriers can have a different bandwidth. In the drawing, the component carriers are adjacent to each other in frequency domain. Yet, the drawing is attributed to the logical concept. Hence, the component carriers may be physically adjacent to each other or may be spaced apart from each other.

A different center frequency may be used for each component carrier. Alternatively, one common center frequency may be used for component carriers physically adjacent to each other. For instance, in FIG. 7, assuming that all component carriers are physically adjacent to each other, it is able to use a center frequency A. Assuming that component carriers are not physically adjacent to each other, it is able to separately use a center frequency A, a center frequency B or the like for each component carrier.

In the present specification, a component carrier may correspond to a system bandwidth of a legacy system. If a component carrier is defined with reference to a legacy system, backward compatibility offering and system design can be facilitated in a wireless communication environment in which an advanced user equipment and a legacy user equipment coexist. For instance, in case that LTE-A system supports carrier aggregation, each component carrier may correspond to a system band of LTE system. In this case, the component carrier may have one of bandwidths including 1.25 MHz, 2.5 MHz, 5 MHz, 10 MHz, 15 MHz, and 20 MHz.

In case that a full system bandwidth is extended by carrier aggregation, a frequency band used for a communication with each user equipment (UE) is defined by component carrier unit. UE A can use a full system band 100 MHz and performs a communication using all of 5 component carriers. Each of UE $B_1$ to UE $B_5$ can use 20 MHz bandwidth only and perform a communication using one component carrier. Each of UE C1 and UE C2 can use 40 MHz bandwidth and perform a communication two component carriers. In this case, the two component carriers may be logically/physically adjacent to each other or may not. The UE $C_1$ shows a case of using two component carriers no adjacent to each other. And, the UE C2 shows a case of using two component carriers adjacent to each other.

The present invention proposes an operation of reducing a power consumption of a UE in a carrier aggregation situation in which the UE transceives data on at least two component carriers. In the following description, assume that UE is set to communicate through two component carriers. One of the two component carriers is named a primary component carrier (PCC or PCell) and the other is named a secondary component carrier (SCC or SCell). Assume that the UE receives various kinds of control signals including PDCCH through PCC. And, assume that cross carrier scheduling (CCS) is applied to data transmission and reception of SCC by a control signal on PCC.

First of all, in a situation that there is no separate instruction from an eNB, the UE does not performing monitoring on SCC and turns off a wireless communication module associated with transmission and reception of the SCC, thereby saving power consumption. Meanwhile, if not receiving a separate instruction for a sleep state from the eNB, the UE performs such a monitoring operation (e.g., a blind decoding on PDCCH, etc.) on PCC. Hence, in order to reduce power consumption in the PCC, the eNB may transmit a signal, which allows the UE to perform a monitoring at a specific time and to enter a sleep state for the rest of time, to the UE.

In this situation, according to the present invention, in case that the eNB intends to perform data transceiving with the UE through SCC, the UE is proposed to prepare for an SCC transceiving operation through PDCCH of PCC at the time of performing the monitoring on the PCC. In particular, the eNB sends a wakeup message through PDCCH of PCC to prepare for an operation on SCC. Having received the wakeup message, the UE activates a wireless communication module related to the operation of the SCC. The above-mentioned operation is described in detail as follows.

<$1^{st}$ Embodiment>

First of all, according to a $1^{st}$ embodiment of the present invention, a case of performing a wakeup message transmission on PDCCH is described. An eNB sends a wakeup message on PDCCH in PCC. Having received the wakeup message, a UE prepares for an operation of SCC.

Figure 8:
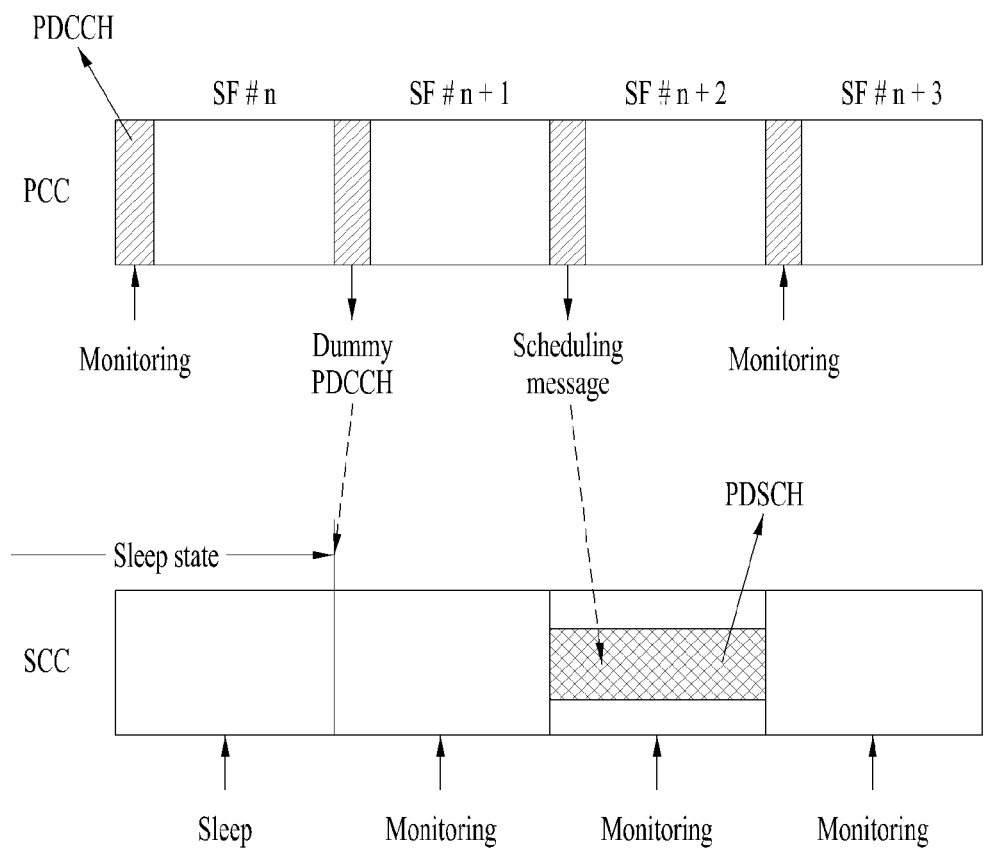
FIG. 8 is a diagram for one example of sending a wakeup message according to a $1^{st}$ embodiment of the present invention.

FIG. 8 is a diagram for one example of sending a wakeup message according to a $1^{st}$ embodiment of the present invention.

Referring to FIG. 8, an eNB or UE can use PDCCH (hereinafter named dummy PDCCH), on which resource allocation is not performed, as a wakeup message. In particular, the eNB transmits PDCCH, on which cross carrier scheduling from PCC to SCC is performed but in which resource allocation information for PDSCH or PUSCH is not included (i.e., every bitmap information for resource allocation is set to 0).

If the UE receives the dummy PDCCH masked with C-RNTI of the UE, the UE regards it as a message for preparing for a communication on SCC and then prepares a corresponding operation. In this case, the corresponding operation can include an operation performed in a manner that the UE performs sampling on OFDM symbols of the SCC and then buffers it until detecting PDCCH containing valid downlink resource allocation information (DL assignment).

The wakeup message or the dummy PDCCH may be restricted to be transmitted in a DCI format 0/1A for a fallback mode operation or a transmission mode dependent DCI format. Alternatively, in order to decrease a blind decoding count, the wakeup message or the dummy PDCCH may be transmitted in a restrictive search space (e.g., a common search space, a UE-specific search space, etc.) only.

For example, the eNB and the UE can use PDCCH for CSI estimation as a wakeup message. In particular, the eNB or UE regards PDCCH for triggering an aperiodic CSI report for SCC or PDCCH for triggering an SRS (sounding reference signal) transmission on SCC as a wakeup message and is then able to perform the above-mentioned operation.

<$2^{nd}$ Embodiment>

According a $2^{nd}$ embodiment of the present invention, a wakeup operation using an activation message is described. An eNB operates in a manner of sending a scheduling message for data transceiving of SCC through PDCCH of PCC only and then sending an activation message indicating an actual data transceiving corresponding to the scheduling message at an appropriate time. If a UE receives scheduling information on PDSCH or PUSCH for SCC through PDCCH of PCC, the UE prepares an operation corresponding to the received scheduling information.

If the PDSCH is scheduled, the eNB transmits PDSCH on SCC at an appropriate time and then informs the UE whether the PDSCH corresponding to the scheduling message previously transmitted at a prescribed time is currently transmitted using an activation message.

Figure 9:
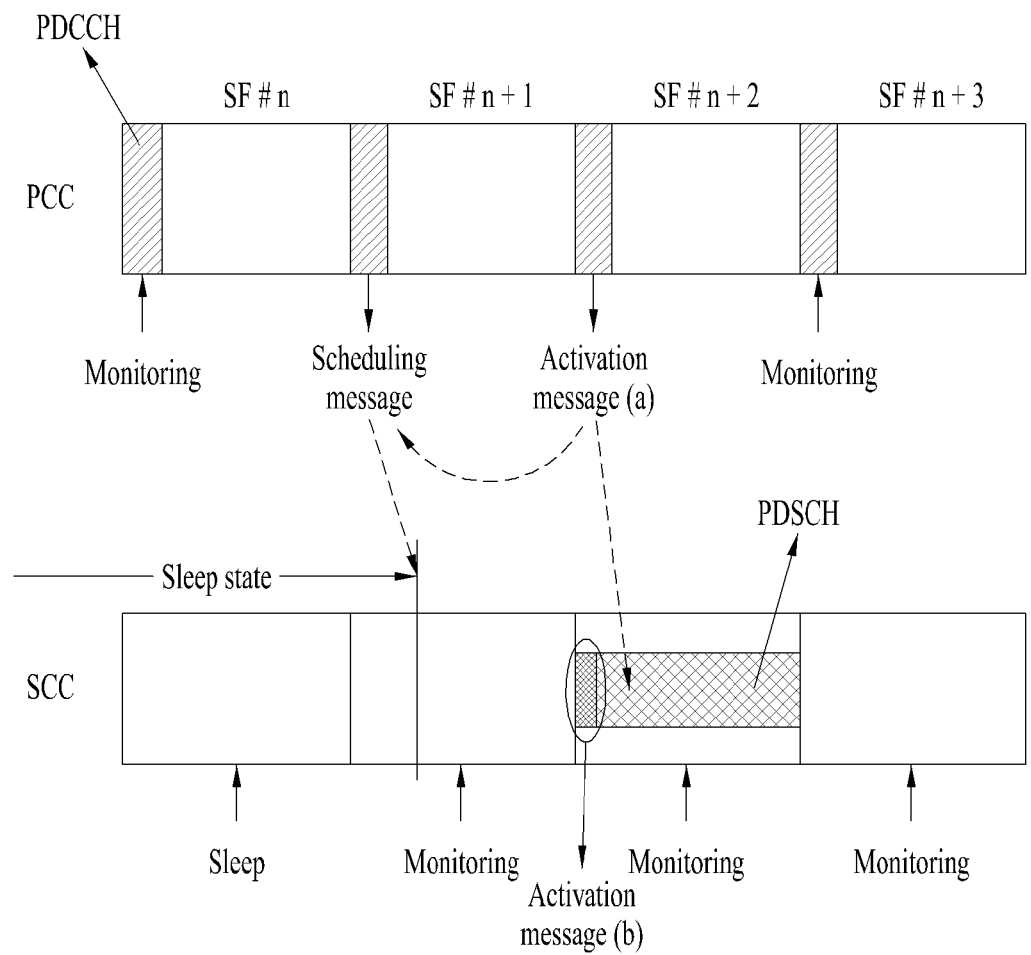
FIG. 9 is a diagram for one example of sending an activation message according to a $2^{nd}$ embodiment of the present invention.

FIG. 9 is a diagram for one example of sending an activation message according to a $2^{nd}$ embodiment of the present invention.

Referring to FIG. 9, such an activation message needs to include an indicator indicating a transmission time of a scheduling message. In this case, the indicator indicating the transmission time of the scheduling message can be explicitly defined as a field indicating a subframe index. And, this field may be transmitted in form of PDCCH of PCC like an activation message (a) shown in FIG. 9.

Alternatively, an activation message (b) shown in FIG. 9 can be implemented in a manner of transmitting a predetermined preamble indicating whether PDSCH is transmitted right before a transmission of PDSCH on SCC and mapping a sequence used for the corresponding preamble and a transmission time of a scheduling message to each other.

<$3^{rd}$ Embodiment>

According to a $3^{rd}$ embodiment of the present invention, a method of initiating a monitoring of SCC with a scheduling message only without a separate activation message and applying resource allocation information included in the scheduling message is described as follows.

Figure 10:
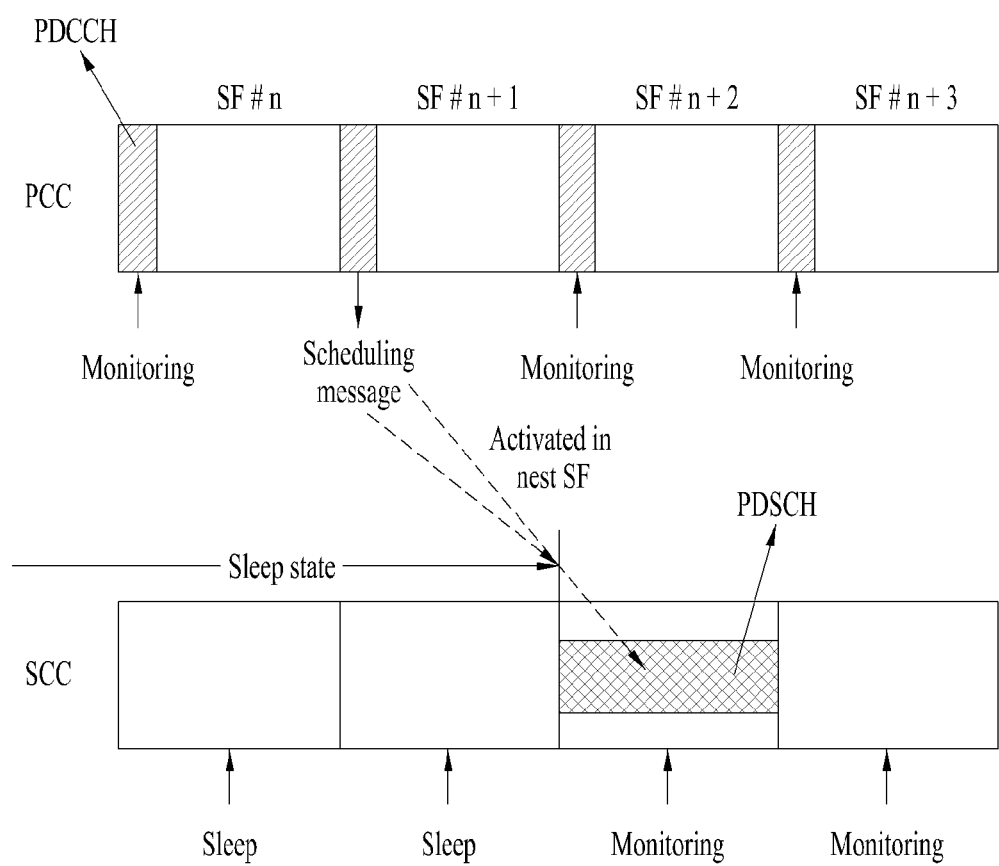
FIG. 10 is a diagram for one example of sending a scheduling message according to a $3^{rd}$ embodiment of the present invention.

FIG. 10 is a diagram for one example of sending a scheduling message according to a $3^{rd}$ embodiment of the present invention.

Referring to FIG. 10, a reception time of a scheduling message can have a relationship with an activation time of a secondary component carrier as a preset relationship without a separate indicator or message. For instance, if a scheduling message is set in SF #n+1 of PCC, a corresponding PDSCH can be previously set to be transmitted in SF #n+1+k of SCC. Like FIG. 10, a value of 'k' can be fixed to such a value as 1 or can be separately indicated using an upper layer signal (e.g., an RRC layer signal, etc.).

Figure 11:
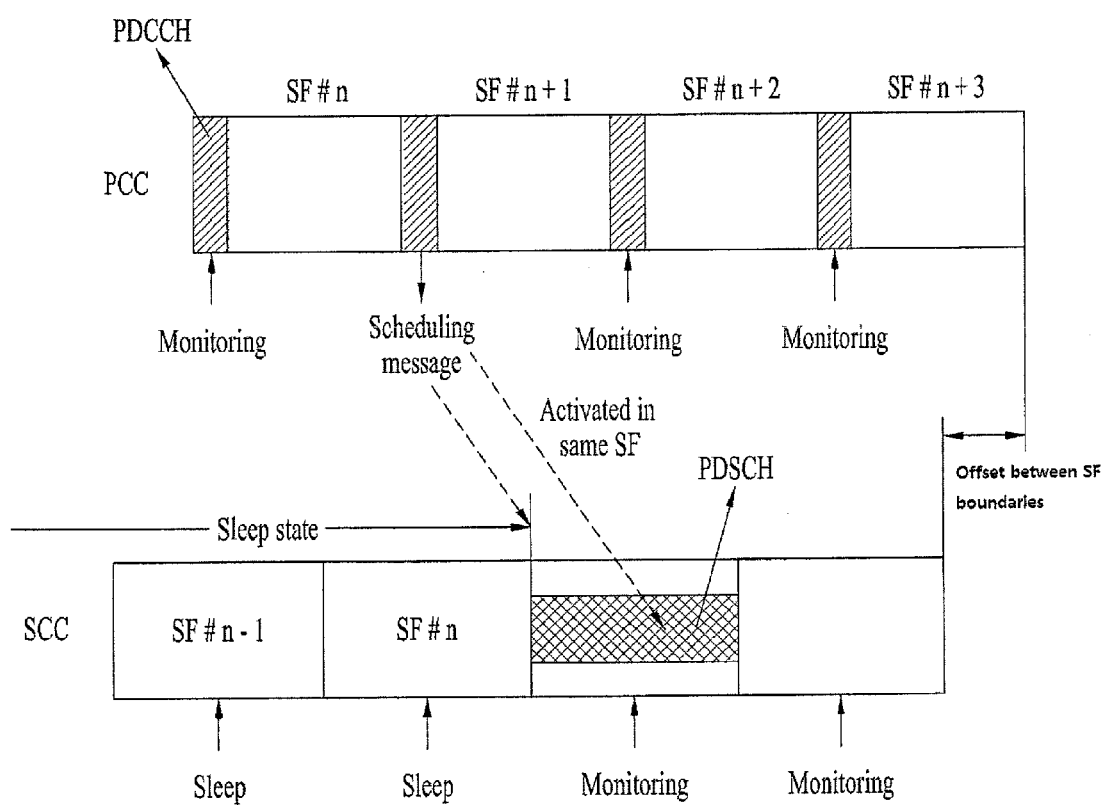
FIG. 11 is a diagram for another example of sending a scheduling message according to a $3^{rd}$ embodiment of the present invention.

FIG. 11 is a diagram for another example of sending a scheduling message according to a $3^{rd}$ embodiment of the present invention.

Referring to FIG. 11, if a subframe boundary of PCC and a subframe boundary of SCC are misaligned from each other by OFDM symbol unit, since PDCCH of PCC is transmitted in a time region belonging to a previous subframe (i.e., PDCCH of SF #n+1 of PCC is transmitted at a time of transmitting SF #n of SCC, in aspect of SCC, the PDCCH of the PCC can be construed as scheduling PDSCH of SCC having the same subframe index.

The relationship between the above-described scheduling message and the activation of the secondary component carrier may be applicable to a case that eNB and UE are unable to use SCC exclusively. In particular, it is specifically effective to a case that SCC is used by contention for medium access with another system through a carrier-sensing scheme.

Figure 12:
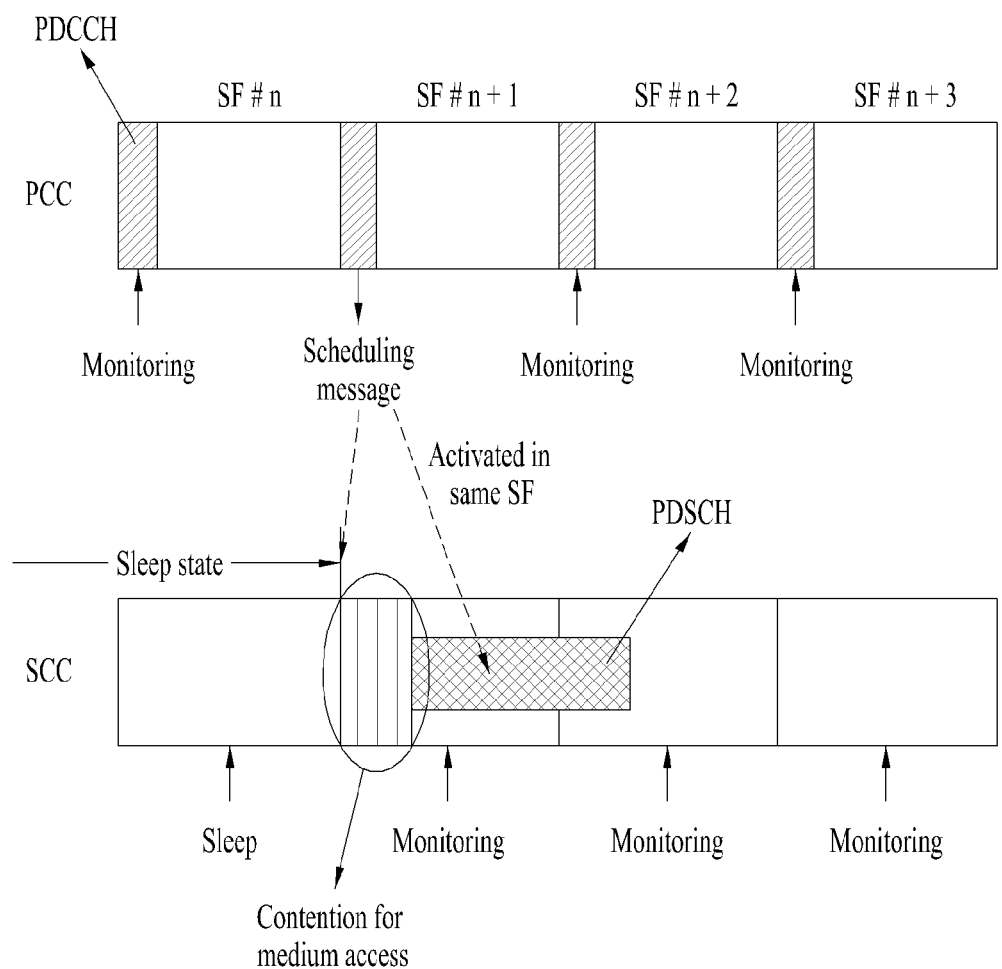
FIG. 12 is a diagram for a further example of sending a scheduling message according to a $3^{rd}$ embodiment of the present invention.

FIG. 12 is a diagram for a further example of sending a scheduling message according to a $3^{rd}$ embodiment of the present invention.

Referring to FIG. 12, although an eNB has sent a scheduling message through PDCCH of PCC at a specific time, it is not clear whether PDSCH of SCC is transmittable at the corresponding time. Moreover, it is not predictable whether a transmission is possible in the future.

In this case, a UE receives a scheduling message of PCC PDCCH and then initiates a monitoring of SCC. Assuming that a corresponding PDSCH is transmitted at a time of transmitting an activation message, the UE performs a contention operation for medium access through carrier detection. If it is detected that there is no communication of another user equipment on a specific component carrier or a specific frequency band (i.e., an idle state is detected), the user equipment sets the specific component carrier or the specific frequency band as the secondary component carrier.

In case of a UL grant for PUSCH transmission, in order for the UE to prepare a transmission of PUSCH, a minimum time interval is necessary between a UL grant reception time and a PUSCH transmission time. Hence, the eNB can operate in a manner of sending the above-mentioned activation message by securing this time interval.

According to the $1^{st}$ to $3^{rd}$ embodiments of the present invention, if PDSCH reception or PUSCH transmission through SCC is ended, a UE stops an operation of the SCC again and is then able to return to a sleep state. In this case, the eNB and the UE agree to a predetermined time T and can operate not to return to the sleep state until the predetermined time T. Such a value of T can be exchanged in advance through an upper layer signal (e.g., RRC layer signal). Moreover, if data transceiving of another valid SCC is performed within the time T, the eNB and the UE may operate not to return to the sleep state.

Figure 13:
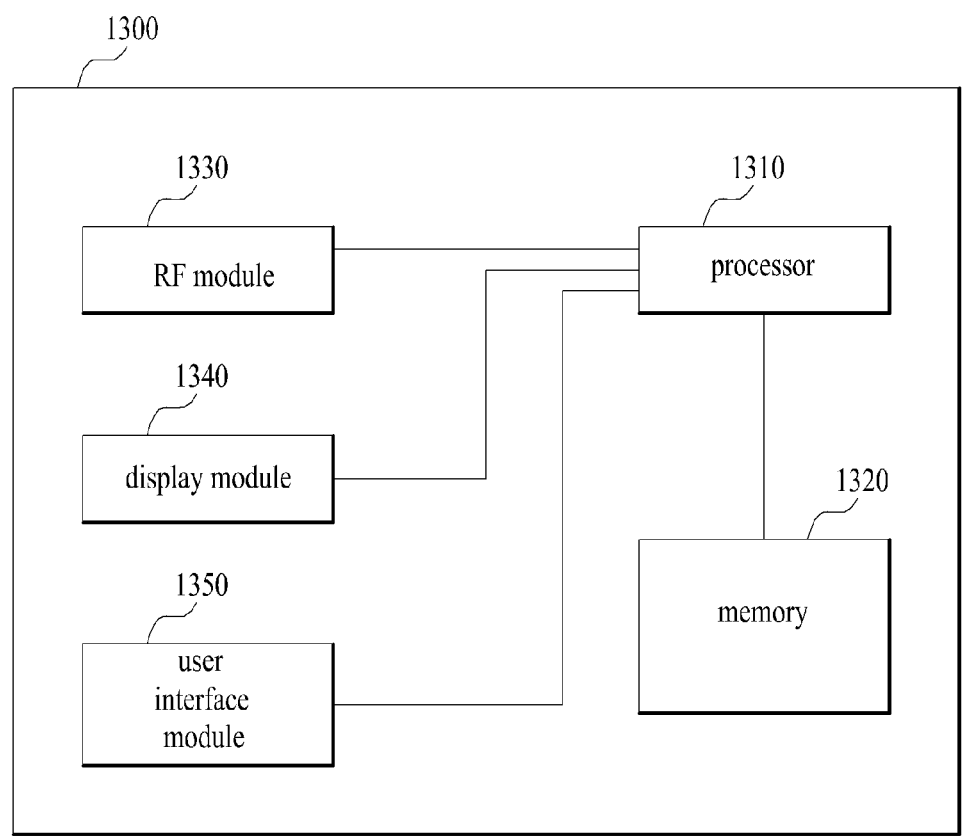
FIG. 13 is a block diagram for one example of a communication device according to one embodiment of the present invention.

FIG. 13 is a block diagram for one example of a communication device according to one embodiment of the present invention.

Referring to FIG. 13, a communication device 1300 includes a processor 1310, a memory 1320, an RF module 1330, a display module 1340 and a user interface module 1350.

The communication device 1300 is illustrated for clarity and convenience of the description and some modules can be omitted. Moreover, the communication device 1300 is able to further include at least one necessary module. And, some modules of the communication device 1300 can be further divided into sub-modules. The processor 1310 is configured to perform operations according to the embodiment of the present invention exemplarily described with reference to the accompanying drawings. In particular, the detailed operations of the processor 1310 can refer to the contents described with reference to FIGS. 1 to 12.

The memory 1320 is connected to the processor 1310 and stores operating systems, applications, program codes, data and the like. The RF module 1330 is connected to the processor 1310 and performs a function of converting a baseband signal to a radio signal or converting a radio signal to a baseband signal. For this, the RF module 1330 performs analog conversion, amplification, filtering and frequency uplink transform or inverse processes thereof. The display module 1340 is connected to the processor 1310 and displays various kinds of informations. The display module 1340 can include such a well-known element as LCD (Liquid Crystal Display), LED (Light Emitting Diode), OLED (Organic Light Emitting Diode) and the like, by which the present invention is non-limited. The user interface module 1350 is connected to the processor 1310 and can include a combination of well-known interfaces including a keypad, a touchscreen and the like.

The above-described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of the appended claims or that the combined claims can be included as new claims by revision after filing an application.

In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other network nodes except the base station. In this case, 'base station' can be replaced by such a terminology as a fixed station, a Node B, an eNode B (eNB), an access point and the like.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

Although a method of controlling a power in a carrier aggregation applied wireless communication system and apparatus therefor are described mainly with reference to examples applied to 3GPP LTE system, as mentioned in the foregoing description, the present invention is applicable to various kinds of wireless communication systems as well as the 3GPP LTE system.

What is claimed is:

1. A method of transceiving a signal, which is transceived with a base station by a user equipment in a carrier aggregation applied wireless communication system, the method comprising:

receiving a scheduling message for a secondary component carrier in a sleep state from the base station through a primary component carrier;

initiating a monitoring of the secondary component carrier after receiving the scheduling message;

receiving an activation message for the secondary component carrier from the base station; and receiving a downlink signal from the base station through the secondary component carrier or transmitting an uplink signal to the base station through the secondary component carrier, based on the activation message, in a first subframe in which the activation message is received or in a second subframe next to the first subframe, wherein the activation message indicates when the scheduling message is to be received.

2. The method of claim 1, wherein the activation message is transmitted on condition that the secondary component carrier is used based on contention with another user equipment.

3. The method of claim 1, wherein the activation message is received from the base station through either the primary component carrier or the secondary component carrier.

4. The method of claim 1, further comprising:

reception of the downlink signal from the base station is completed or transmission of the uplink signal to the base station is completed, enabling the secondary component carrier to enter the sleep state.

5. The method of claim 1, wherein the step of initiating the monitoring of the secondary component carrier comprises:

performing a carrier sensing for a specific component carrier; and if the specific component carrier is in an idle state, setting the specific component carrier to be used for the secondary component carrier.

6. A method of transceiving a signal, which is transceived with a base station by a user equipment in a carrier aggregation applied wireless communication system, the method comprising:

receiving a scheduling message for a secondary component carrier in a sleep state from the base station through a primary component carrier;

initiating a monitoring of the secondary component carrier by starting with an activation subframe indicated by the scheduling message; and in a subframe starting with the activation subframe or a subframe next to the activation subframe, receiving a downlink signal from the base station through the secondary component carrier or transmitting an uplink signal to the base station through the secondary component carrier, wherein a subframe in which the downlink signal is received, is configured to have a predetermined interval with a subframe in which the scheduling message is to be received.

* * * * *